United States Patent Office 3,419,560
Patented Dec. 31, 1968

3,419,560
1-AMINOALKYL 2-ARYL INDANES AND
TETRAHYDRONAPHTHALENES
Jack Bernstein, New Brunswick, John Krapcho, Somerset, and Chester Turk, Elizabeth, N.J., assignors to E. R. Squibb & Sons, Inc., New York, N.Y., a corporation of Delaware
No Drawing. Continuation-in-part of application Ser. No. 454,962, May 11, 1965. This application Oct. 23, 1965, Ser. No. 504,122
8 Claims. (Cl. 260—268)

ABSTRACT OF THE DISCLOSURE 1-aminoalkyl-2-aryl indanes, tetrahydronaphthalenes, indanols and napthols are described. The compounds are analgesic.

---

This application is a continuation-in-part of U.S. application Ser. No. 454,962, filed May 11, 1965, now abandoned.

This invention relates to new chemical compounds having valuable therapeutic properties and processes for the preparation thereof.

The therapeutically active compounds of this invention are bases of the general formula I

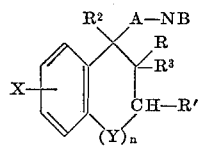

I steroisomers and the acid-addition salts thereof, A is a lower alkylene (preferably ethylene and propylene); and NB is a basic nitrogen containing radical of less than twelve carbon atoms; X is hydrogen, lower alkyl, lower alkoxy, phenoxy, hydroxy, alkylthio, nitro, amino, dialkylamino, halo and trifluoromethyl; Y is —$CH_2$—, —$CH_2CH_2$—, —O—, and —S—; $R_3$ is aryl (such as X-substituted phenyl, pyridyl, thienyl and furyl); R is lower alkyl, aryl (defined above), cycloalkyl, aralkyl (such as benzyl and 2-pyridylethyl), cycloalkylalkylene (such as cyclopropylmethyl), allyl and propargyl; R' is hydrogen and lower alkyl; $R^2$ is hydrogen, hydroxy, acyloxy and alkoxy; n is zero to one.

Among the suitable radicals represented by the symbol NB are: amino; (lower alkyl)amino; di(lower alkyl) amino; phenyl-(lower alkyl)amino; N-(lower alkyl)-N-phenyl (lower alkyl)amino; and saturated 5 to 6 membered monocyclic heterocyclic radicals of less than twelve carbon atoms, as exemplified by piperidino; (lower alkyl)piperidino; di(lower alkyl)piperidino; (lower alkoxy)piperidino; 2, 3 or 4-piperidyl; 2, 3 or 4-(N-lower alkylpiperidyl); pyrrolidino; (lower alkyl)pyrrolidino; di(lower alkyl)pyrrolidino; (lower alkoxy)pyrrolidino; 2 or 3-pyrrolidyl; 2 or 3-(N-lower alkylpyrrolidyl); morpholino; (lower alkyl)-morpholino; di (lower alkyl)morpholino; (lower alkoxy)morpholino; thiamorpholino; (lower alkyl)thiamorpholino; di(lower alkyl)-thiamorpholino; (lower alkoxy)thiamorpholino; piperazino; (lower alkyl)piperazino (e.g., N⁴-methyl-piperazino); di(lower alkyl)-piperazino; (lower alkoxy) piperazino; the N⁴-substituent on the piperazino group is aryl, aryl-alkylene and X-substituted cinnamyl. Acyl represents the acyl moiety of an acid group consisting of a lower alkanoic acid of less than twelve carbons, e.g., acetic, propionic, butyric and tert-pentanoic acid; monocyclic hydrocarbon monocarboxylic acids of from six to twelve carbons, e.g., benzoic and toluic acid; and mononuclear aromatic hydrocarbon aralkanoic acids, e.g., phenacetic and β-phenylpropionic acid; the lower alkenoic acids; the cycloalkane-carboxylic acids and the cycloalkenecarboxylic aids; alkoxy represents o-alkyl moieties wherein the alkyl has from one to ten carbons, preferably from one to eight carbons, such as ethoxy, pentoxy, isopropoxy, hexyloxy and so forth.

The terms "lower alkyl," "lower alkoxy," and "lower alkylene," as employed herein, include both straight and branched chain radicals of from one to eight carbon atoms. The particularly preferred compounds are those wherein X is hydrogen or chloro, R is methyl, $R^1$ is hydrogen, $R^2$ is hydroxyl, $R^3$ is phenyl, A is ethylene or propylene, B is di(lower alkyl)amino, and n is zero. As to the salts, those coming within the purview of this invention include the acid-addition salts, particularly the non-toxic acid-addition salts, and the quaternary ammonium salts. Acids useful for preparing these acid-addition salts inter alia, inorganic acids, such as the hydrohalic acids (e.g., hydrochloric and hydrobromic acid), sulfuric acid, nitric acid, boric acid and phosphoric acid, and organic acids such as cyclohexanesulfamic, malic, oxalic, tartaric, citric, acetic and succinic acid, theophylline and 8-chlorotheophylline. The quaternary ammonium salts include those formed with lower alkyl halides (e.g., methyl bromide, ethyl chloride and propyl iodide), benzyl halides (e.g., benzyl chloride) and di-lower alkyl sulfates (e.g., dimethyl sulfate.)

The compounds of this invention and the acid-addition salts thereof are therapeutically active compounds which have analgestic activity. This activity was found to be surprisingly high when administered orally.

The compounds of this invention may be prepared by condensing intermediates of Formula II

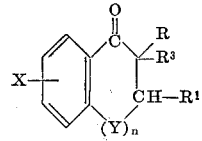

II wherein X, Y, R, $R^1$, $R^3$ and n are as defined above, with a reactant having the formula Hal-Mg-A-NB, which is prepared from magnesium powder and Hal-A-NB, wherein Hal, A and B are as defined above. The product formed by this reaction is illustrated by Formula I, wherein $R^2$ is hydroxy.

Compounds of Formula II may be prepared by reacting ketones having the formula

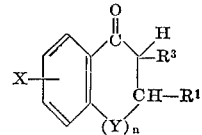

III wherein X, Y, $R^1$, $R^3$ and n are as defined above, with an alkali metal hydride (e.g., sodium hydride) or alkali metal amide (e.g., potassium amide) and then with R-Hal, wherein Hal and R are as defined above, (e.g., butyl iodide, cyclohexyl bromide or benzyl chloride).

The hydroxy end-product may be converted to an acyloxy derivative by reacting it with reagents such as butyl or phenyl lithium and then with an anhydride, such as acetic anhydride, propionic anhydride, and so forth. The alkoxy derivative may be prepared by reacting the hydroxyl end-product with equivalent amounts of an alkali metal amide or hydride such as sodium amide, lithium hydride, and then with an equivalent or excess amount of alkyl halide such as ethyl iodide, heptyl chloride, decyl bromide, and so forth.

The compounds wherein R$^2$ is hydrogen are obtained by first dehydrating the compounds of general Formula I to the unsaturated compound and then hydrogenating the double bond by a catalytic procedure.

It is preferred to dehydrate the compounds of Formula I by treatment with an equivalent amount of an acyl halide (e.g., propionyl chloride), but other methods may also be utilized. The hydrogenation of this unsaturated intermediate may be carried out by any known means, such as by catalysts such as palladium on carbon, platinum oxide, etc.

Alternatively, some compounds of this invention, i.e., those wherein A is ethylene, may be prepared by treating compounds of Formula II with about two equivalents of sodium or potassium in liquid ammonia and then reacting this mixture with a compound having the formula Hal-A-NB, wherein Hal and B are as described above and A is ethylene.

Among the starting reactants of the invention are 2-methyl-2-phenyl-1-indanone;
2-phenyl-2-benzyl-1-indanone;
2,3dimethyl-2-phenyl-1-indanone;
6-butoxy-3-hexyl-2-phenethyl-2-(p-chlorophenyl)-1-indanone;
5-phenoxy-2-pyridyl-2-benzyl-1-indanone;
4-hydroxy-2-(m-methoxyphenyl)-2-(2-pyridylethyl)-1-indanone;
2-thienyl-2-cyclopropylmethyl-1-indanone;
2-furyl-2-ethyl-1-indanone;
2-hexyl-2-phenyl-1-indanone;
5-methylthio-2-phenyl-2-propargyl-1-indanone;
6-nitro-2-methyl-2-phenyl-1-indanone and
5,5-dimethylamino-2-butyl-2-phenyl-1-indanone;
2-methyl-2-phenyl-1-tetralone;
2-methyl-2-(p-fluorophenyl)-1-tetralone;
2-benzyl-2-phenyl-1-tetralone;
2-methyl-2-phenyl-1-benzosuberanone;
2-methyl-2-phenyl-1-chromanone and
2-methyl-2-phenyl-1-thiochromanone.

The compounds of this invention may be obtained as mixtures of diastereoisomeric compounds or the salts thereof when ever these compounds contain more than one asymmetric carbon atom. Such mixtures of racemates may be separated into the individual racemic compounds, the salts or the quaternary ammonium compounds thereof on the basis of physico-chemical differences, such as solubility, for example, by fractionated crystallization, if necessary, of a derivative, e.g., salt or quaternary ammonum compound thereof. The racemates of the compounds of this invention may be resolved into the optically active d- and l-forms according to procedures known for the resolution of racemic compounds. For example, use of d-tartaric acid, dibenzoyl-d-tartaric acid, l-malic acid, d-camphorsulfonic acid, etc.

The following examples illustrate the invention. All temperatures are in degrees centigrade unless otherwise stated.

Example 1.—1-(3-dimethylaminopropyl)-2-methyl-2-phenyl-1-indanol, hydrochloride (isomer A)

A suspension of 16 g. of magnesium powder in 60 ml. of dry tetrahydrofuran is stirred and treated with about 50 ml. of a solution of 80 g. of 3-dimethylaminopropyl chloride in 240 ml. of dry tetrahydrofuran. A few crystals (about 100 mg.) of iodine are added to the mixture and then heated gently at a temperature of about 66° C. The reaction becomes exothermic and is controlled by brief cooling with an ice bath. The mixture is allowed to reflux at a temperature of about 66° C. during the addition of the remainder of the 3-dimethylamino propyl chloride solution and then continued for an additional 30 minutes.

The external heating is discontinued during the addition (20 minute period) of a solution of 50 g. of 2-methyl-2-phenyl-1-indanone in 250 ml. of dry tetrahydrofuran, the resutling mixture is refluxed for 6 hours at a temperature of about 66° C., allowed to stand overnight at room temperature and then added to a cold solution of 300 g. of ammonium chloride in 1.5 l. of water. The mixture is extracted several times with ether, the organic phases are combined, dried over magnesium sulfate and filtered. The filtrate is concentrated on a rotary evaporator to give a crystalline residue. The latter is treated with 2 l. of ether and 200 ml. of water and the mixture shaken. The organic phase is dried over magnesium sulfate, filtered and concentrated to give 56 g. of crystalline residue having a melting point of about 93–120° C. This material is digested with 350 ml. of hot hexane leaving 4.8 g. of insoluble material, melting point about 134–136° C. Cooling the hexane solution gives 39.0 g. of material melting point about 98–120° C. This material is suspended in 200 ml. of ether leaving 8.9 g. of insoluble material, melting point about 134–136° C. Concentration of the combined hexane and ether solutions gives 38 g. of solid, melting point about 93–96° C. Recrystallization from 150 ml. of hexane gives 27.3 g. of solid, melting point about 98–100° C.

The latter material is dissolved in 125 ml. of ethanol and treated with 17 ml. of 5.9 N alcoholic hydrogen chloride and the resulting solution is diluted to about 1 l. with anhydrous ether to give 22 g. of colorless solid, melting point about 163–165° C. After crystallization from 90 ml. of ethanol-900 ml. of ether, the colorless solid 1-(3-dimethylaminopropyl) - 2-methyl-2-phenyl-1-indanol, hydrochloride melts at 171–173° C.

Example 2.—1-(3-dimethylaminopropyl-2-methyl-2-phenyl-1-indanol, hydrochloride (isomer B)

The two fractions of material from Example 1 which melts at 134–316° C. (4.8 g. and 8.9 g.) are combined and crystallized from 75 ml. of acetonitrile to give 11.2 g. of product, melting point about 134–136° C. This material is dissolved in 50 ml. of chloroform and treated with 7 ml. of 5.5 N alcoholic hydrogen chloride. Dilution of this solution with 400 ml. of ether gives 10.5 g. of solid, melting point about 157–161° C. After crystallization from 30 ml. methanol-300 ml. of ether, the colorless solid 1-(3-dimethylaminopropyl)-2-methyl-2-phenyl-1-indanol, hydrochloride melts at 173–175° C.

Example 3.—1-(3-dimethylaminopropyl)-1,2,3,4-tetrahydro-2-methyl-2-phenyl - 1 - naphthol, hydrochloride (isomer A)

Following the procedures of Example 1, but substituting an equivalent amount of 2-methyl-2-phenyltetralone for the 2-methyl-2-phenyl-1-indanone, there is obtained 65 g. of product in the form of a free base which is a mixture of isomers. By dissolving this material in 130 ml. of hexane, isomer A crystallizes in pure form, weight 33.0 g., melting point 77–79° C. A solution of 28.4 g. of this material in 50 ml. of ethanol and 50 ml. of ether is treated with 26.2 ml. of 3.4 N alcoholic hydrogen chloride and the resulting solution diluted to 600 ml. with ether to give 31.5 g. of colorless solid, melting point 214–215°.

Concentration of the hexane filtrate which yields 33 g. of isomer A under reduced pressure gives isomer B. This base is converted to the hydrochloride salt in the same manner as described for isomer A.

Example 4.—1-(3-diethylaminopropyl)-2-methyl-2-phenyl-1-indanol, hydrochloride

Following the procedure of Example 1, but substituting an equivalent amount of 2-diethylaminopropyl chloride for 3-dimethylaminopropyl chloride, a colorless product is obtained.

Example 5.—1-[3-(1-pyrrolidino)propyl]-2-methyl-
2-phenyl-1-indanol, hydrochloride Following the procedure of Example 1, but substituting an equivalent amount of 3-(1-pyrrolidino)propyl chloride for 3-dimethylaminopropyl chloride, a colorless product is obtained.

Example 6.—1-[3-(N-methyl-N-phenethylamino)propyl]-
2-methyl-2-phenyl-1-indanol, hydrochloride Substituting an equivalent quantity of 3-(N-methyl-N-phenethylamino)propyl chloride for the 3-dimethylaminopropyl chloride of Example 1, the product obtained is 1-[3-(N-methyl-N-phenethylamino)propyl] - 2 - methyl-2-phenyl-1-indanol, hydrochloride.

Example 7.—1-(3-dimethylamino-2-methylpropyl)-2-
methyl-2-phenyl-1-indanol, hydrochloride Substituting the molar equivalent of 3-dimethylamino-2-methylpropyl chloride in lieu of 3-dimethylaminopropyl chloride of Example 1, the product formed is 1-[3-dimethylamino-2-methylpropyl] - 2 - methyl - 2 - phenyl-1-indanol, hydrochloride.

Example 8.—1-[3-(4-o-methoxyphenyl-1-piperazinyl)
propyl]-2-methyl-2-phenyl-1-indanol, hydrochloride Substituting a molar equivalent of 3-(4-o-methoxyphenyl-1-piperazinyl)propyl bromide instead of 3-dimethylaminopropyl chloride of Example 1, the product formed is 1-[3-(4-o-methoxyphenyl-1-piperazinyl)propyl]-2-methyl-2-phenyl-1-indanol, hydrochloride.

Example 9.—1-[(2-pyridyl)methyl]-2-methyl-2-phenyl-
1-indanol, hydrochloride

Following the procedure of Example 1, but utilizing a molar equivalent of the lithium derivative of α-picoline in place of the magnesium derivative of 3-dimethylaminopropyl chloride, the product formed is 1-[(2-pyridyl)methyl]-2-methyl-2-phenyl-1-indanol, hydrochloride.

Example 10.—1-[3-(4-phenyl-1-piperazinyl)propyl]-2-
methyl-2-phenyl-1-indanol, hydrochloride Following the procedure of Example 1, but utilizing an equivalent molar quantity of 3-(4-phenyl-1-piperazinyl)propyl bromide in lieu of 3-dimethylaminopropyl chloride, the product formed is 1-[3-(4-phenyl-1-piperazinyl)propyl]-2-methyl-2-phenyl-1-indanol, hydrochloride.

If the procedure of Example 1 is followed but in lieu of 2-methyl-2-phenylindanone, the reactants utilized are molar equivalents of 2,3-dimethyl-2-phenyl-1-indanone;
6-butoxy-3-hexyl-2-phenethyl-2-(p-chlorophenyl)-
  1-indanone;
5-phenoxy-2-pyridyl-2-benzyl-1-indanone;
4-hydroxy-2-(m-methoxyphenyl)-2-(2-pyridyl-
  ethyl)-1-indanone;
2-thienyl-2-cyclopropylmethyl-1-indanone;
2-furyl-2-ethyl-1-indanone;
2-hexyl-2-phenyl-1-indanone;
5-methylthio-2-phenyl-2-propargyl-1-indanone;
6-nitro-2-methyl-2-phenyl-1-indanone and
5,5-dimethylamino-2-butyl-2-phenyl-1-indanone;
2-methyl-2-phenyl-1-tetralone;
2-methyl-2-(p-fluorophenyl)-1-tetralone;
2-benzyl-2-phenyl-1-tetralone;
2-methyl-2-phenyl-1-benzosuberanone;
2-methyl-2-phenyl-1-chromanone and
2-methyl-2-phenyl-1-thiochromanone;

the products formed are 1-(3-dimethylaminopropyl)-2,3-dimethyl-2-phenyl-
  1-indanol;
1-(3-dimethylaminopropyl)-6-butoxy-3-hexyl-2-
  phenethyl-2-(p-chlorophenyl)-1-indanol;
1-(3-dimethylaminopropyl)-5-phenoxy-2-pyridyl-
  2-benzyl-1-indanol;
1-(3-dimethylaminopropyl)-4-hydroxy-2-(m-methoxy-
  phenyl-2-(2-pyridylethyl)-1-indanol;
1-(3-dimethylaminopropyl)-2-thienyl-2-cyclopropyl-
  methyl-1-indanol;
1-(3-dimethylaminopropyl)-2-furyl-2-ethyl-
  1-indanol;
1-(3-dimethylaminopropyl)-5-methylthio-2-phenyl-
  2-propargyl-1-indanol;
1-(3-dimethylaminopropyl)-6-nitro-2-methyl-
  2-phenyl-1-indanol;
1-(3-dimethylaminopropyl)-5,5-dimethylamino-
  2-butyl-2-phenyl-1-indanol;
1-(3-dimethylaminopropyl)-2-methyl-2-phenyl-
  1-naphthol;
1-(3-dimethylaminopropyl)-2-methyl-2-(p-
  fluorophenyl)-1-naphthol;
1-(3-dimethylaminopropyl)-2-benzyl-2-phenyl-
  1-naphthol;
1-(3-dimethylaminopropyl)-2-methyl-2-phenyl-
  1-benzosuberanol;
1-(3-dimethylaminopropyl)-2-methyl-2-phenyl-
  1-chromanol;
1-(3-dimethylaminopropyl)-2-methyl-2-phenyl-
  1-thiochromanol.

Example 11.—N,N-dimethyl-3-(2-methyl-2-phenyl)-1-
indanylidene-propylamine, hydrochloride A solution of 10.0 g. of material from Example 1 in 200 ml. of chloroform is cooled in an ice bath and treated with a solution of 3.2 g. of propionyl chloride in 75 ml. of chloroform and the resulting solution is allowed to stand at room temperature for 12 hours. The solvent is removed under pressure and the resulting residue is triturated with 200 ml. of ether to give 8.5 g. of solid, melting point 80–83°. Recrystallization from 50 ml. of ethanol, 950 ml. of ether gives 5.3 g. of product, melting point 83–85°.

Example 12.—N,N-dimethyl-3-(2-methyl-2-phenyl-1-
indanyl)-propylamine, hydrochloride A mixture of 3.6 g. of material from Example 11, 3.0 g. of 5% palladium on carbon and 100 ml. of ethanol is placed in a hydrogenation apparatus at 50 pounds pressure. The theoretical quantity of hydrogen is consumed in 15 minutes. The catalyst is filtered and the filtrate is concentrated under reduced pressure. The residue is diluted with 100 ml. of ether to give 3.1 g. of colorless product, melting point 224–226°. After crystallization from 40 ml. of acetonitrile, the material weighs 2.0 g. melting point 231–233°.

Example 13.—1-(3-dimethylaminopropyl)-2-benzyl-2-
phenyl-1-indanol, hydrochloride (A) 2-benzyl-2-phenyl-1-indanone.—A suspension of 9.6 g. of 50% sodium hydride dispersion in 1.5 l. of toluene is treated with 44.0 g. of 2-phenyl-1-indanone and the mixture stirred and refluxed for one hour. The solution is cooled to 45°, treated with a solution of 25.3 g. of benzyl chloride in 300 ml. of toluene and the mixture stirred and refluxed for 3 hours. After cooling to room temperature, the mixture is treated with 200 ml. of water The organic phase is dried over magnesium sulfate, filtered and the filtrate concentrated under reduced pressure to give 2-benzyl-2-phenyl-1-indanone.

(B) 1 - (2-dimethylaminopropyl)-2-benzyl-2-phenyl-1-indanol, hydrochloride.—Following the procedure of Example 1, but substituting 60.0 g. of material from part A for the 2-methyl-2-phenyl-1-indanone, the desired product is obtained.

Example 14.—1-(3-dimethylaminopropyl)-2,2-diphenyl-
1-indanol, hydrochloride

Following the procedure of Example 1, but utilizing 2,2-diphenyl - 1 - indanone in lieu of 2 - methyl - 2-phenyl-1- indanone the product formed will be 1-(3-dimethylaminopropyl)-2,2-diphenyl-1-indanol, hydrochloride.

While there have been described various embodiments of the invention, the compositions and methods described are not intended to be understood as limiting the scope of the invention, as it is realized that changes therein are possible, and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound having the formula

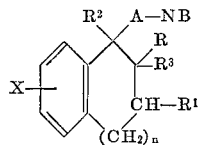

wherein A is lower alkylene, NB is a basic nitrogen containing radical of less than twelve carbon atoms selected from the group consisting of amino; (lower alkyl)amino; di(lower alkyl)amino; phenyl(lower alkyl)amino; N-(lower alkyl)-N-phenyl(lower alkyl)amino; piperidino; (lower alkyl)piperidino; di(lower alkyl)piperidino; (lower alkoxy)piperidino; 2,3 or 4-piperidyl; 2,3 or 4-(N-lower alkylpiperidyl); pyrrolidino; (lower alkyl)pyrrolidino; di-(lower alkyl)pyrrolidino; (lower alkoxy)pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl) piperazino; di(lower alkyl)piperazino; (lower alkoxy) piperazino; and cinnamyl; X is selected from the group consisting of hydrogen, lower alkyl, lower alkoxy, phenoxy, hydroxy, alkylthio, nitro, amino, dialkylamino, halo and trifluoromethyl; R is selected from the group consisting of lower alkyl, phenyl, X-substituted phenyl, pyridyl, thienyl or furyl, cyclopropyl or cyclobutyl, lower alkyl phenyl, cyclopropyl alkylene, cyclobutyl alkylene, allyl and propargyl; $R^1$ is selected from the group consisting of hydrogen and lower alkyl; $R^2$ is selected from the group consisting of hydrogen, hydroxy, acyloxy wherein the acyl is a hydrocarbon carboxylic acid of less than twelve carbons and lower alkoxy; $R^3$ is phenyl, X-substituted phenyl, pyridyl, thienyl or furyl; and $n$ is zero to one; and non-toxic salts thereof.

2. 1-(3-dimethylaminopropyl)-2-methyl-2-phenyl-1-indanol, hydrochloride.

3. 1-(3-dimethylaminopropyl)-1,2,3,4-tetrahydro-2-methyl-2-phenyl-1-naphthol, hydrochloride.

4. 1-[3-(4-phenyl-1-piperazinyl)propyl]-2-methyl-2-phenyl-1-indanol, hydrochloride.

5. N,N-dimethyl-3-(2-methyl-2-phenyl)-1-indanylidene-propylamine, hydrochloride.

6. N,N-dimethyl-3-(2-methyl-2-phenyl-1-indanyl)-propylamine, hydrochloride.

7. 1-(3-dimethylaminopropyl)-2-benzyl-2-phenyl-1-indanol, hydrochloride.

8. A compound having the formula

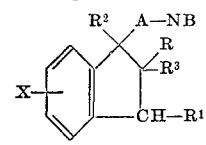

wherein R, $R^1$, $R^2$, $R^3$, X, A and NB are as described in claim 1.

References Cited

UNITED STATES PATENTS

| 2,884,434 | 4/1959 | Campbell et al. | 260—570.8 |
| 3,142,682 | 7/1964 | De Stevens | 260—295 |
| 3,301,866 | 1/1967 | Draper | 260—570.8 |

ALEX MAZEL, Primary Examiner.

D. G. DAUS, Assistant Examiner.

U.S. Cl. X.R.

167—65; 260—240, 243, 247, 247.1, 247.5, 247.7, 256, 293.4, 294.3, 294.7, 294.8, 296, 327, 329, 332.3, 345.2, 346.2, 347.8, 567.6, 570.5, 570.8, 590

UNITED STATES PATENT OFFICE
CERTIFICATE OF CORRECTION

Patent No. 3,419,560   December 31, 1968

Jack Berstein et al.

It is certified that error appears in the above identified patent and that said Letters Patent are hereby corrected as shown below:

Column 1, line 15, "1-aminoalkyl-2-aryl" should read -- 1-Aminoalkyl-aryl --. Column 2, line 4, "aids" should read -- acids --; line 31, "nalgestic" should read -- analgesic --. Column 5, line 46, cancel "1-indanol, drochloride.". Column 6, line 34, "8.5" should read -- 9.5 --; line 66, B) 1-(2-" should read -- (B) 1-(3- --. Column 7, line 41, "lower alkyl, enyl," should read -- lower alkyl, --. Column 8, line 5, "$R^3$ is phenyl, X-bstituted phenyl," should read -- $R^3$ is X-substituted phenyl. --.

Signed and sealed this 17th day of March 1970.

(SEAL)
Attest:

Edward M. Fletcher, Jr.    WILLIAM E. SCHUYLER, JR.
Attesting Officer                    Commissioner of Patents